(12) United States Patent
Riley

(10) Patent No.: US 11,388,967 B1
(45) Date of Patent: Jul. 19, 2022

(54) DEVICE PROTECTOR

(71) Applicant: Logan R. Riley, Reno, NV (US)

(72) Inventor: Logan R. Riley, Reno, NV (US)

(*) Notice: Subject to any disclaimer, the term of this patent is extended or adjusted under 35 U.S.C. 154(b) by 0 days.

(21) Appl. No.: 17/512,593

(22) Filed: Oct. 27, 2021

Related U.S. Application Data (60) Provisional application No. 63/219,354, filed on Jul. 7, 2021.

(51) Int. Cl.
*A45C 11/00* (2006.01)
*H04B 1/3888* (2015.01)
*A45C 13/10* (2006.01)

(52) U.S. Cl.
CPC .......... *A45C 11/00* (2013.01); *A45C 13/1069* (2013.01); *H04B 1/3888* (2013.01); *A45C 2011/002* (2013.01)

(58) Field of Classification Search
CPC ................ A45C 11/00; A45C 13/1069; A45C 2011/002; H04B 1/3888
See application file for complete search history.

(56) References Cited

U.S. PATENT DOCUMENTS

| | | |
|---|---|---|
| D662,100 S | 6/2012 | Van Den Nieuwenhuizen |
| D670,702 S | 11/2012 | Zhang |
| 8,676,281 B1 | 3/2014 | Caulder |
| D709,895 S | 7/2014 | Son |
| D713,833 S | 9/2014 | Wilkey |
| D743,407 S | 11/2015 | Lin |
| 9,199,432 B2 | 12/2015 | Planche |
| 9,379,759 B2 | 6/2016 | Platt |
| 9,529,387 B2 | 12/2016 | Carnevali |
| 9,584,639 B2 | 2/2017 | Slaby |
| D785,614 S | 5/2017 | Bergreen |
| 9,723,113 B2 | 8/2017 | Thompson |
| 9,867,439 B2 | 1/2018 | Planche |
| 9,894,192 B2 | 2/2018 | Cox |
| 9,917,937 B1* | 3/2018 | Fathollahi ............ H04B 1/3888 |
| D855,057 S | 7/2019 | Siedow |
| 10,348,354 B1* | 7/2019 | Balourdet ............ G06F 1/1688 |
| 10,558,239 B2 | 2/2020 | Lee |
| 10,652,379 B2 | 5/2020 | Holder |
| 10,764,417 B1 | 9/2020 | Malach |
| 10,784,916 B2 | 9/2020 | Coverstone |
| 2011/0077061 A1 | 3/2011 | Danze |
| 2011/0192857 A1 | 8/2011 | Rothbaum |
| 2012/0252543 A1 | 10/2012 | Cho |
| 2013/0098788 A1 | 4/2013 | Mccarville |
| 2013/0257240 A1 | 10/2013 | Hong |
| 2014/0272240 A1 | 3/2014 | Caulder |

(Continued)

FOREIGN PATENT DOCUMENTS

KR 200475554 Y1 12/2014
WO 2021044149 A1 3/2021

*Primary Examiner* — Md K Talukder
(74) *Attorney, Agent, or Firm* — Redbrick IP, P.C.

(57) ABSTRACT

Devices herein generally describe a protector for a device such as a phone or tablet that includes a magnet and allows for the transfer of power and data. The protector is generally flat, and affixes itself to the back of a device using the magnet. To prevent unintentional rotation and/or sliding off with respect to the device, rather than surround the device itself, the protector includes an opening that surrounds a protrusion on the device, which may include the device's camera.

20 Claims, 10 Drawing Sheets

(56) References Cited

U.S. PATENT DOCUMENTS

| | | |
|---|---|---|
| 2014/0103789 A1 | 4/2014 | Cox |
| 2014/0152890 A1* | 6/2014 | Rayner ................ H04M 1/185 |
| | | 277/312 |
| 2014/0263939 A1* | 9/2014 | Rinner ................ F16M 11/105 |
| | | 248/688 |
| 2014/0287800 A1 | 9/2014 | Ho |
| 2015/0065206 A1 | 3/2015 | Rojas |
| 2015/0111623 A1* | 4/2015 | Hegemier ............... B44C 1/105 |
| | | 455/575.1 |
| 2015/0151515 A1* | 6/2015 | Skepton ................ G06F 1/1628 |
| | | 428/354 |
| 2015/0201723 A1* | 7/2015 | Rayner ................ F16M 13/00 |
| | | 224/191 |
| 2015/0207535 A1* | 7/2015 | Wilson ................ H01F 7/0252 |
| | | 455/575.8 |
| 2016/0072933 A1* | 3/2016 | Cox, III ................ H04M 1/185 |
| | | 455/575.8 |
| 2016/0106202 A1 | 4/2016 | Ford |
| 2017/0155418 A1 | 6/2017 | Kim |
| 2017/0196331 A1 | 7/2017 | Gluck |
| 2018/0063306 A1 | 3/2018 | Scannell |
| 2019/0198212 A1* | 6/2019 | Levy ........................ H01F 7/02 |
| 2020/0144858 A1 | 5/2020 | Su |
| 2021/0168229 A1* | 6/2021 | Kallman ............... G06F 1/1698 |
| 2021/0409058 A1* | 12/2021 | Johnson ............... H04B 1/3888 |

* cited by examiner

DEVICE PROTECTOR

CROSS-REFERENCE TO RELATED APPLICATIONS

This application claims the benefit of U.S. Provisional Patent Application Ser. No. 63/219,354, entitled "MAGNETIC BACKPLATE FOR MOBILE DEVICE", filed Jul. 7, 2021, the entire disclosure of which is incorporated by reference herein, in its entirety, for all purposes.

BACKGROUND

Advances in electronic devices throughout the last decade has created lighter and more portable devices. These include cell phones, tablets, and the like. As these devices become increasingly complex, so do their protective cases. These cases are typically attached to a phone or tablet and protect it from scratches and cracks. These cases are also used for aesthetic purposes and may include decorative designs.

Increasingly, portable electronic devices charge and transmit data using wireless ports. Whereas before a cable was required to be directly plugged into a device, today's devices may not even include a port. This increase in wireless transmission technologies has created a need for new types of protectors capable of taking advantage of newer portable electronic devices.

SUMMARY

Embodiments provide technical solutions to the aforementioned and other technical problems. In general, in one embodiment, a cell phone device protector is described. The cell phone device protector may include a backplate body. The backplate body may include an inner side that is flat and does not include perpendicularly rising edges. The backplate body may also include an outer side that is flat and does not include perpendicularly rising edges. The backplate body may also include a cutout portion operable to surround an outer boundary of a camera bump. The cell phone device protector may also include at least one magnet. The magnet may be located within the backplate body. The magnet may also be operable to attached a device body via magnetic force.

In general, in one aspect, embodiments relate to a device accessory. The device accessory may include a backplate body. The backplate body may include an inner side that is flat. The backplate body may also include a mortise operable to substantially abut a boundary of a raised portion of a device. The backplate body may also include at least one magnet. The at least one magnet may be located at least partially in the backplate body, and be operable to attract the device via magnetic force.

In general, in one aspect, embodiments relate to a device protector. The device protector includes a backplate body. The backplate body may include an inner side that is flat and does not comprise perpendicular rising edges. The backplate body may also include an opening operable to substantially surround a boundary of a raised portion of a device. The device protector may also include at least one magnet. The at least one magnet may be located at least partially in the backplate body, and be operable to attract the device via magnetic force.

Other aspects of the invention will be apparent from the following description and the appended claims.

BRIEF DESCRIPTION OF THE DRAWINGS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

Embodiments of the present invention are illustrated by way of example, and not by way of limitation, in the figures of the accompanying drawings and in which like reference numerals refer to similar elements.

DETAILED DESCRIPTION OF THE INVENTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Various embodiments of the inventions described herein provide for a device protector (e.g., covers, plate, etc.) for devices (e.g., mobile phones, tablet computers, etc.) and associated devices (e.g., earphones, microphones, watches, biometric monitors, etc.). In one or more embodiments, the device protector can be protective in nature and/or have aesthetically pleasing adornment. In one or more embodiments, the device may or may not be an electronic device.

Figure 1:
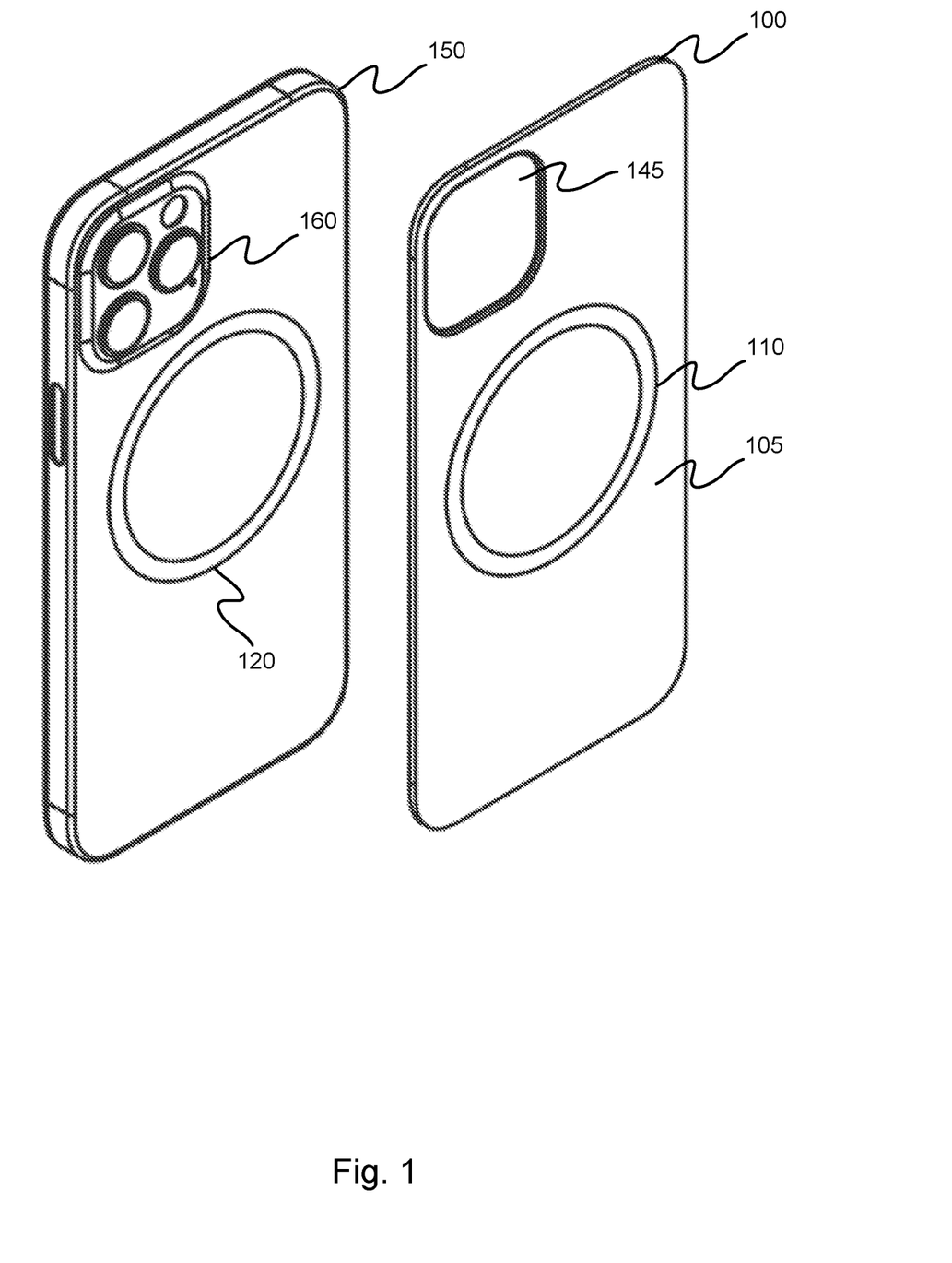
FIG. 1 illustrates an exemplary depiction of a device protector and a device, in accordance with one or more embodiments of the invention.

FIG. 1 illustrates an example device protector 100 and an example device 150. In one or more embodiments, the device protector 100 may include a backplate body 105 and at least one magnet 110 (aka magnet(s) 110). While the magnet(s) 110 may be inside or embedded in the backplate body 105, the magnet(s) 110 may be distinct components. For example, the backplate body 105 may be made of plastic, metal, wood, paper, leather, or carbon fiber, and it may include at least one magnet 110 made of another material. Together, the backplate body 105 and the at least one magnet 110 constitute, at least in part, device protector 100.

While many protective cases surround the body of a device, embodiments herein describe a device protector 100 that does not surround the device 150 itself. In one or more embodiments, the device protector 100 (or backplate 105) is substantially or completely flat at least on an inner side that may physically couple with a device body (e.g., without elevations/protrusions on either side, including but not limited to, greater than one (1) or two (2) millimeters (mm)). This allows a device protector to affix cleanly (e.g., flatly or in a flush manner) with a device.

Further, as can be seen in the figures included herein, the backplate body does not extend around the sides of the device. For example, the backplate body may not include portions that extend in a generally perpendicular fashion to hold the device protector in place. Rather, embodiments herein describe a device protector that does not surround the device's body.

In one or more embodiments, an outer side of the backplate body is substantially flat. For example, from the side, this backplate body may look similar to a credit card or another flat object.

In one or more embodiments, the device protector 100 may include an opening 145 (e.g., a mortise, cutout, aperture, or hole). The opening 145 will be discussed further herein.

Figure 4:
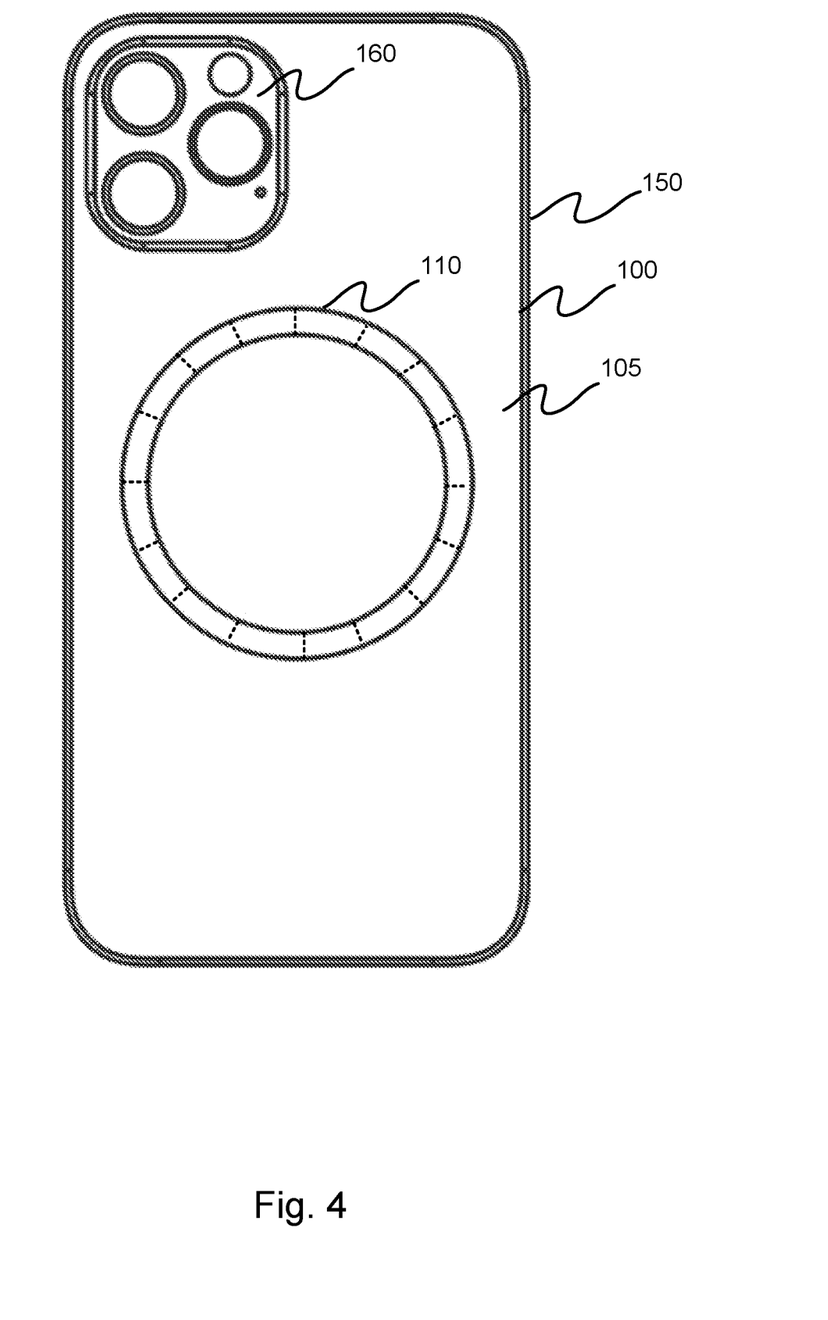
FIG. 4 illustrates an exemplary depiction of a device protector and a device, in accordance with one or more embodiments of the invention.

Referring to FIG. 4, in one or more embodiments, the magnet 110 may include multiple magnets. For example, the dotted lines illustrate areas of 16 different magnets. It should be noted that in FIG. 4, the device 150 is located behind (i.e., "into the" page) with respect to the device protector 100. For that reason, the elevated area 160 of the device 150 is visible.

In one or more embodiments, a device protector may include at least one magnet. In some embodiments, the at least one magnet may be semi-circles and/or substantially circular in shape. For example, a magnet may be a single ring, or multiple magnets may be positioned in a backplate body with a circular arrangement pattern (which may have gaps between magnets). It should be appreciated that the magnets is not limited to circular arrangements, but could be in any shape (e.g., square, rectangular, oval, triangular, to name a few).

In one or more embodiments, at least one set of magnets is in a first position and a second set of magnets is in a second position. For example, two rings of magnets may exist within a device protector and/or a device it can affix itself to. In one or more embodiments, any of the magnet configurations described herein may include at least one magnet capable of transmitting/allowing for the transmission of data and/or power.

In one or more embodiments, the backplate body is one integral mass. For example, the backplate body is an injection mold around at least one magnet. In another example, the backplate body is die cast around at least one magnet. In one or more embodiments, the backplate body may or may not be made of one single piece of material.

In one or more embodiments, the backplate body includes two or more layers. For example, the backplate body comprises two layers that are pressed or "sandwiched" around at least one magnet. One or both of the layers may include one or more spaces to accommodate the magnet(s). The backplate body may include machined/billet or forged metal.

In one or more embodiments, at least one magnet may be a rare-earth magnet. In one or more embodiments, a backplate body may include plastic, metal, wood, paper, leather, etc. In one or more embodiments, a backplate body may include a non-magnetic metal. For example, a magnet may be at least partially included in a backplate made of aluminum, gold, silver, copper, etc.

Figure 5:
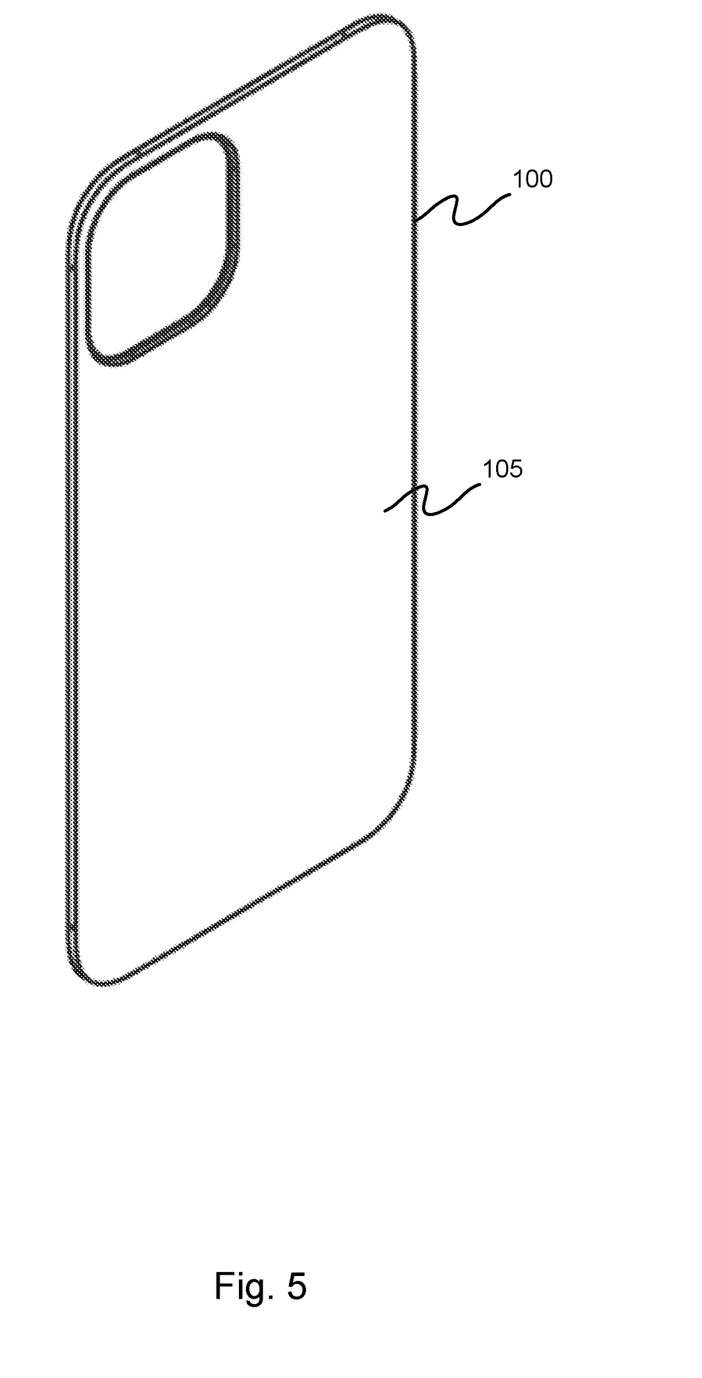
FIG. 5 illustrates an exemplary depiction of a device protector, in accordance with one or more embodiments of the invention.

Referring to FIG. 5, in one or more embodiments, the magnet is not visible from the exterior of the device protector. Figures herein may depict a magnet 110 (and magnet 120) for illustrative purposes, but the magnet 110 may be completely covered by the backplate body 105. For example, a device protector 100 that includes at least one magnet 110 is depicted, but the magnet 110 is not visible because it is located inside the backplate body 105.

Returning to FIG. 1, the example device 150 can be one of many devices, including, but not limited to: a smart phone, a tablet computer, a television, a monitor, a biometric sensor, a watch, etc. In one or more embodiments, the device 150 includes one or more magnets 120. The magnet(s) 120 may be for charging, physical mounting, and/or data transmission. Just like the magnet(s) 110 of the device protector 100, the magnet(s) 120 may be located inside the device 150 and therefore not actually externally visible.

Figure 3:
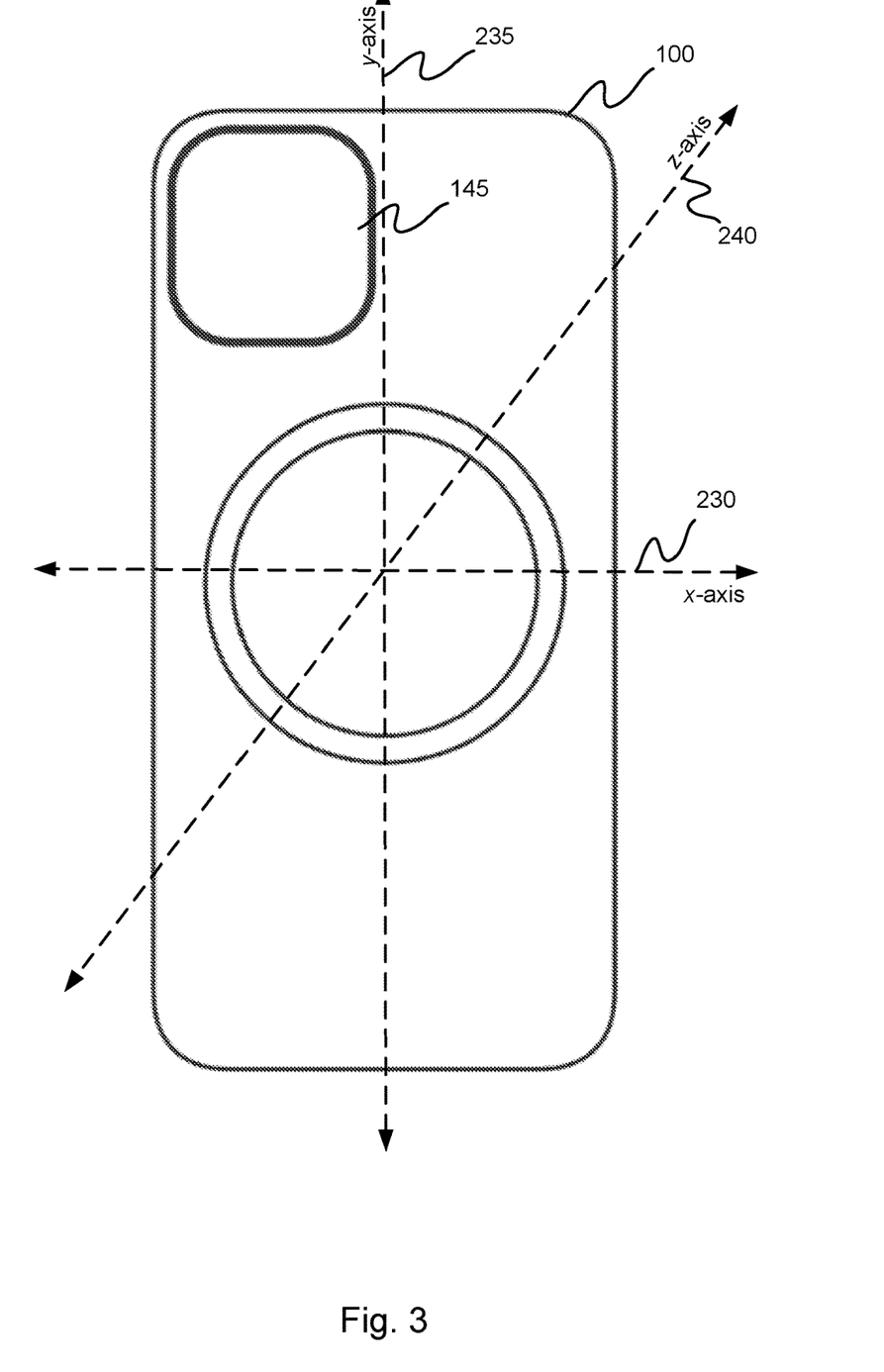
FIG. 3 illustrates an exemplary depiction of a device protector, in accordance with one or more embodiments of the invention.

In one or more embodiments, the device 150 includes an elevated area 160 that is elevated with respect to the surface of the device 150 (e.g., in a z-axis direction "into and out of" the page as illustrated by FIG. 3 discussed herein, when the device 150 and the device protector 100 are joined). In some embodiments, the elevated area 160 may be an area that includes one or more cameras and/or lights (also referred to as a camera bump 160 herein). In some embodiments, the elevated area 160 may be at least one camera lens frame/assembly (e.g., a structure concentrically surrounding and/or supporting a camera lens or body), and/or at least one flash light frame/assembly (e.g., a structure concentrically surrounding and/or supporting a flash light) (also referred to as a camera bump 160 herein). In some embodiments, the elevated area 160 may not include one or more cameras and/or lights, but instead include other components or no other components at all. The camera bump 160 may be a portion of a device that includes a clear cover, this cover may be clear in order to allow for the capturing of images by the device 150.

Figure 2:
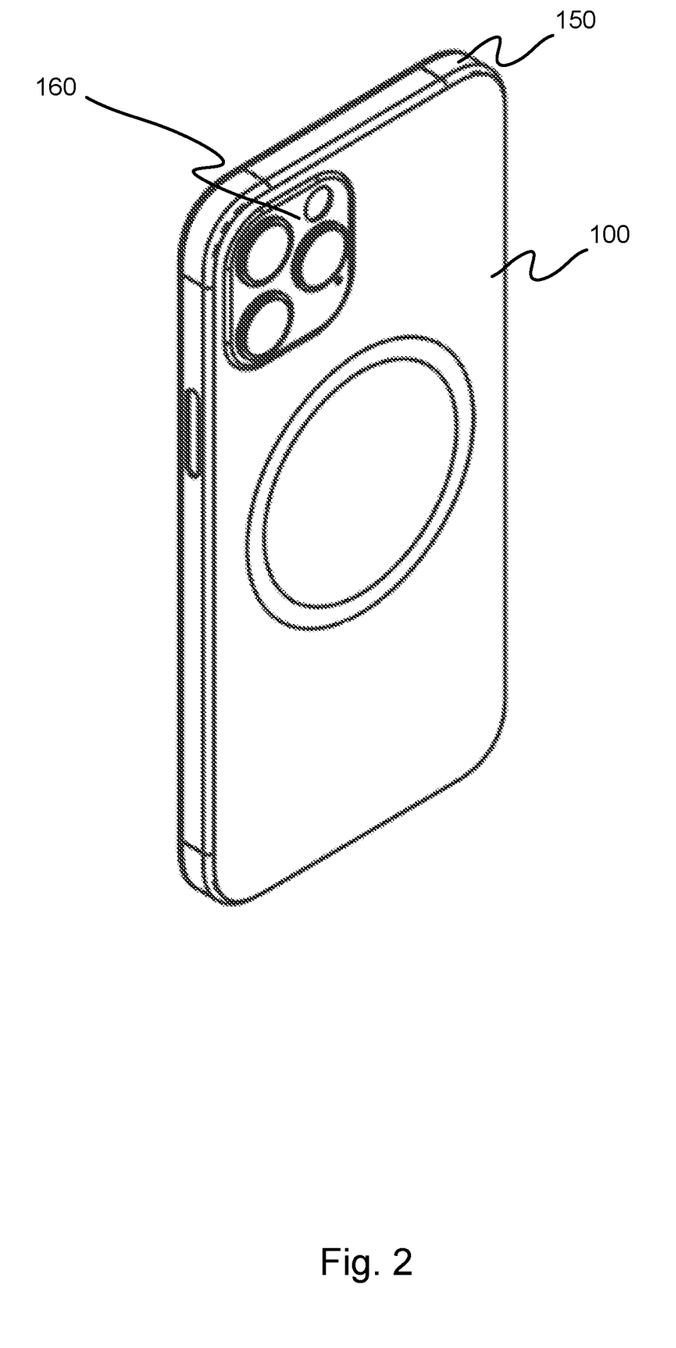
FIG. 2 illustrates an exemplary depiction of a device protector and a device, in accordance with one or more embodiments of the invention.

FIG. 2 illustrates the example device protector 100 and the example device 150 in a joined state. In other words, the device protector 100 is lying flat against the surface of the device 105. In various embodiments, the device protector 100 and device 105 are physically coupled and remain coupled due to the attractive forces of the magnets 110 and 120.

With respect to FIG. 3, an x-axis 230 and y-axis 235 of the device protector 100 are orthogonal to one another, and contained by and extend within a plane encompassing the backplate 105. A z-axis 240 is orthogonal to the x-axis 230 and y-axis 235 and extends "into" and "out of" the page.

Returning to FIG. 2, in one or more embodiments, the opening 145 of the device protector 100 may surround, at least partially hug, abut, or closely/snuggly fit the elevated area 160 of the device 150 when the device protector 100 and device 105 are physically coupled. If there were no elevated area 160 for the opening 145 in device protector 100 (and/or backplate 105) to surround, the device protector 100 would be able to rotate around the z-axis 240 and/or slide in the xy-plane (i.e., in the x-axis and/or y-axis direction), because there could be nothing to stop the device protector 100 (and/or backplate 105) from rotating/sliding. Put another way, device protector 100 would be free to spin around z-axis 240 and/or slide in the xy-plane but for being obstructed by the elevated area 160.

Such a design allows for a device protector that does not surround the sides of the device, but does not rotate and/or slide even though it is only attached to the device by a magnet. In some embodiments, the device protector 100 (and/or backplate 105) does not have perpendicularly rising edges (in the z-axis 240 direction) that would surround or at least come in contact with the sides of device 150.

In other words, the elevated area 160 (e.g., a camera bump 160) of the device 150 may act similarly to a tenon, whereas the opening 145 of the device protector 100 may act similarly to a mortise. Accordingly, the mortise/tenon-like mechanism may secure the device protector 100 with respect to the device 150 about the z-axis 240 (rotationally) and/or along the xy-plane (linearly).

For example, consider an embodiment in which the device 150 is a mobile phone with the device protector 100 magnetically attached thereto, via magnetic forces between the device 150 and the device protector 100. Further, the device protector 100 is secured via an elevated area 160 of the device 150. In such an embodiment, if a user were to interact with the device in a regular manner, the device protector 100 would not (or rarely) unintentionally become unattached. For example, the device protector 100 would remain attached upon placement in/removal from clothing pockets, purses, backpacks, etc. In another example, the device protector 100 would remain attached while in a user's hands when walking, making hand gestures, taking regular photos, taking "selfie" photos, manipulating the orientation to landscape mode for viewing fullscreen movies, etc.

In one or more embodiments, the device protector 100 includes a protruding area on the inner side intended to attach to a device (not shown in the figures). The protruding area may be operable to fit with a notch, groove, or other indented shape on the device. Accordingly, in such embodiments, the device protector's protruding area acts as a tenon while the device acts as a mortise. As a result, the device protector 100 may be prevented from rotation and/or sliding. In one or more embodiments, the device protector 100 includes one or more openings 145, one or more protruding areas, and/or a combination thereof.

In one or more embodiments, the device protector 100 (and at least one magnet 120) may be operable to transmit or allow the transmission of data and/or power. For example, the device protector 100 may transmit and/or enable the transmission of data and/or power between the device 150 and another device such as a charging pad, a stand, an electric socket, a computer, and/or a portable device. Accordingly, the device protector 100 may only minimally or not at all interfere with the device 150 operation with respect to other devices such as a charging pad or mounting pad.

Figure 6:
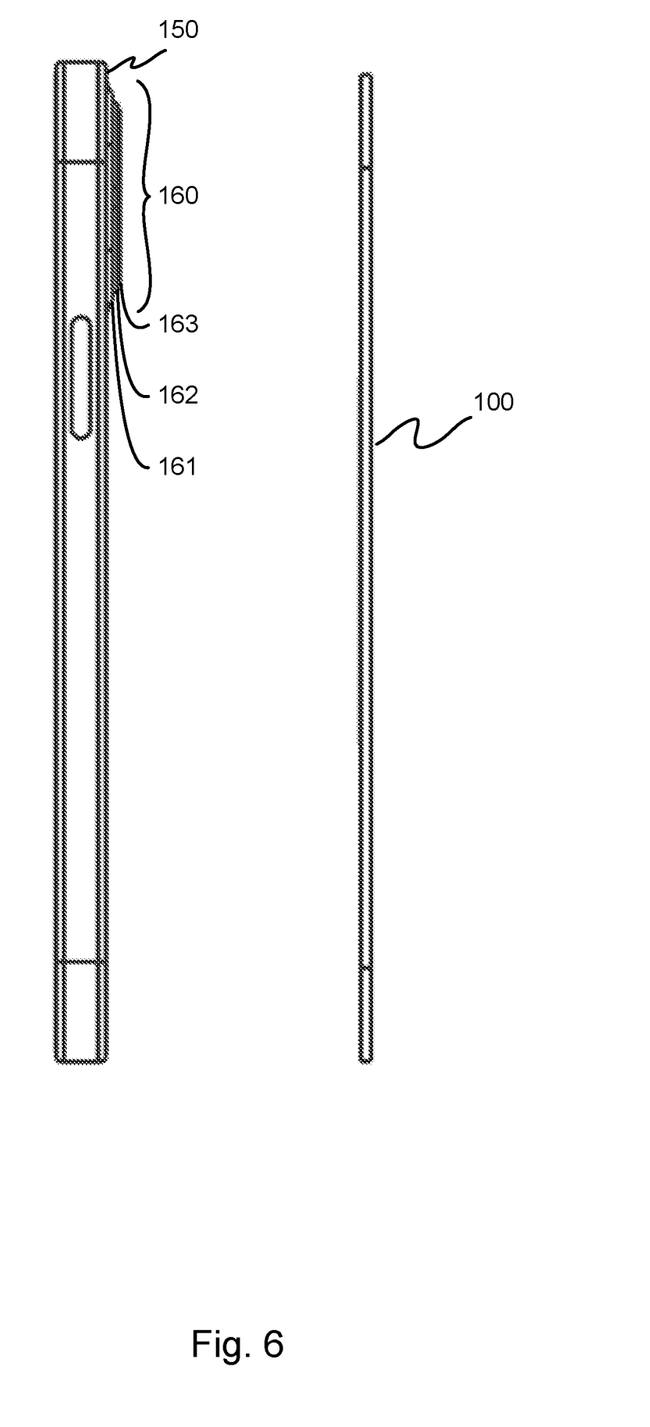
FIG. 6 illustrates an exemplary depiction of a device protector and a device, in accordance with one or more embodiments of the invention.

FIG. 6 illustrates side views of the example device protector 100 and the example device 150 in a separated state. As illustrated by FIG. 6, the camera bump 160 is elevated with respect to a surface of the device 150 (the back side in this example).

Figure 7:
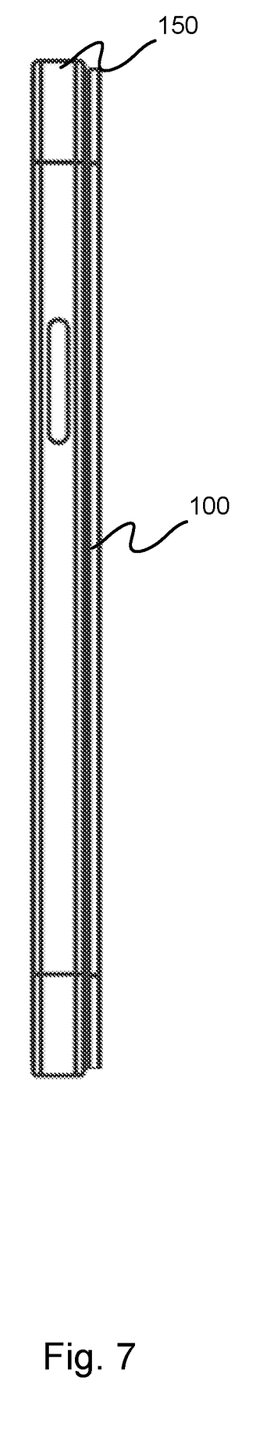
FIG. 7 illustrates an exemplary depiction of a device protector and a device, in accordance with one or more embodiments of the invention.

FIG. 7 illustrates side views of the example device protector 100 and the example device 150 in a joined state. In one or more embodiments, a backplate body thickness may be equal to or greater than the height of a camera bump (the device's protrusion), and/or to a height of one or more lenses located in the camera bump. For example, as illustrated by FIG. 7, the camera bump 160 is no longer visible from a side view because the backplate body 105 thickness may be equal to or greater than the height of a camera bump 160. In one or more embodiments, a backplate body thickness may be less than the height of a camera bump (the device's protrusion), and/or to a height of one or more lenses located in the camera bump.

In one or more embodiments, the thickness of the backplate 105 (and/or the device protector 100) is approximately, including but not limited to, 0.5 mm, 0.75 mm, 1 mm, 1.25 mm, or 1.5 mm.

Figure 8:
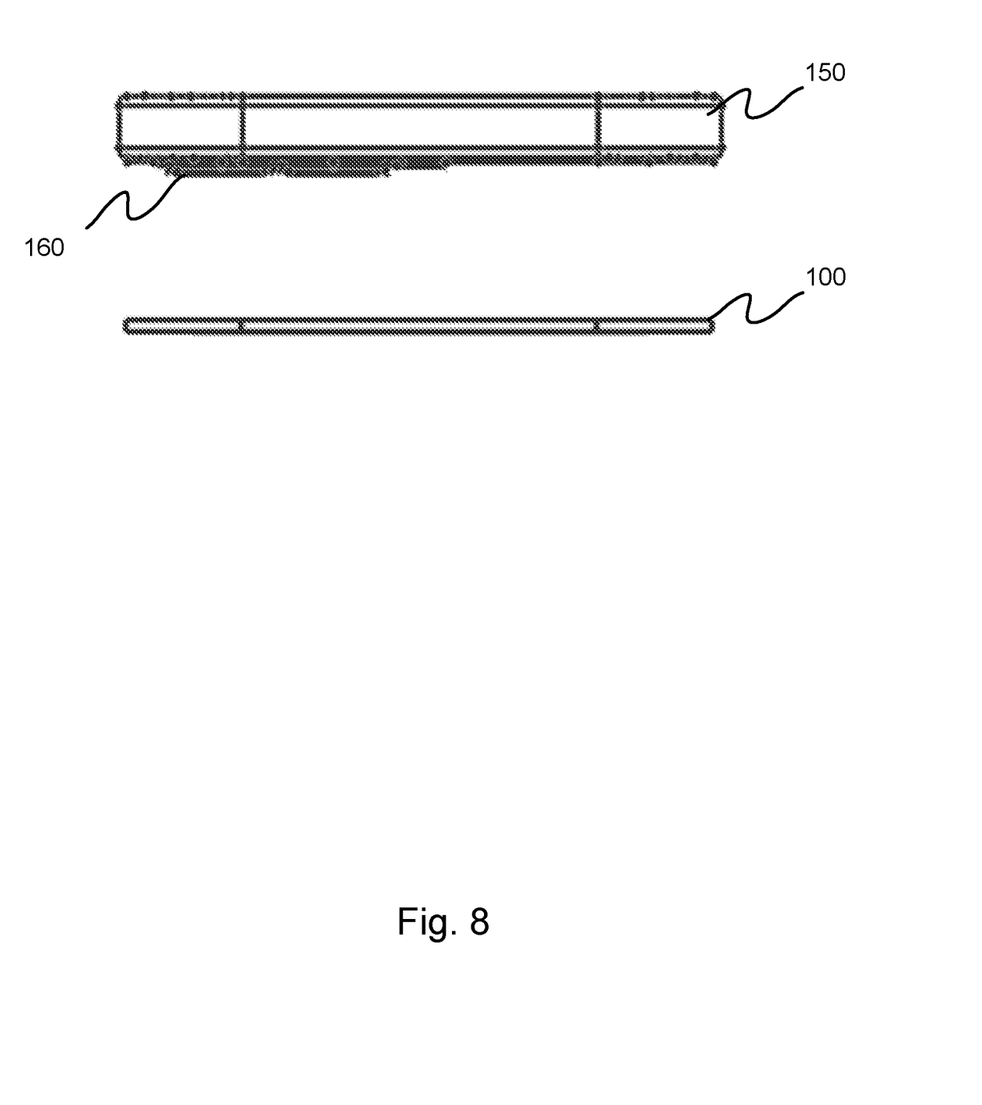
FIG. 8 illustrates an exemplary depiction of a device protector and a device, in accordance with one or more embodiments of the invention.

FIG. 8 illustrates top views of the example device protector 100 and the example device 150 in a separated state. As illustrated by FIG. 8, the camera bump 160 is elevated with respect to a surface of the device 150 (the back side in this example).

Figure 9:
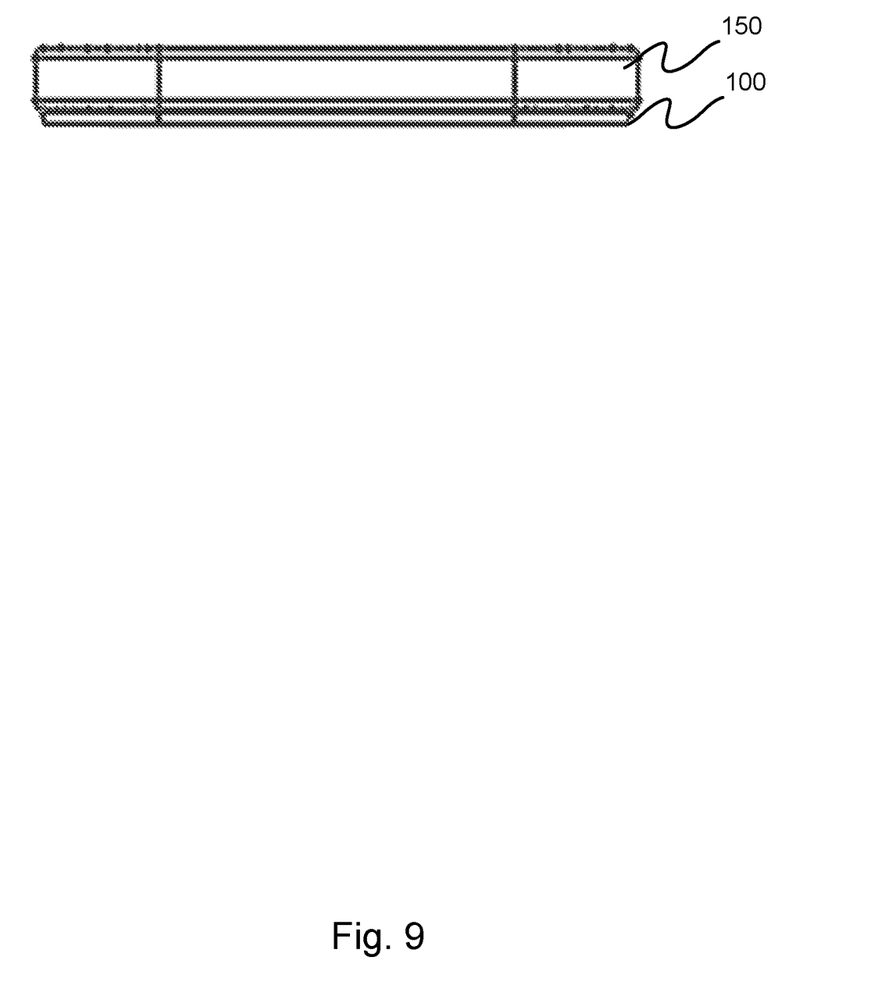
FIG. 9 illustrates an exemplary depiction of a device protector and a device, in accordance with one or more embodiments of the invention.

FIG. 9 illustrates top views of the example device protector 100 and the example device 150 in a joined state. In one or more embodiments, a backplate body thickness may be equal to or greater than the height of a camera bump (the device's protrusion), and/or to a height of one or more lenses located in the camera bump. For example, as illustrated by FIG. 9, the camera bump 160 is no longer visible from a top view because the backplate body 105 thickness may be equal to or greater than the height of a camera bump 160. In one or more embodiments, a backplate body thickness may be less than the height of a camera bump (the device's protrusion), and/or to a height of one or more lenses located in the camera bump.

In one or more embodiments, a backplate body may include one or more layers or steps of different sizes. For example, referring to FIG. 6, the camera bump 160 may include layers or steps with different levels of elevation. For example, an elevation step 161 may correspond to an elevation of the camera bump base, an elevation step 162 may correspond to an elevation of camera lens frame/assembly (e.g., a structure concentrically surrounding a camera lens), and an elevation step 163 may correspond to an elevation of the camera lenses. Specifically, with respect to the z-axis direction, the elevation step 161 is closest to the device's surface (shortest), the elevation step 162 is farther from the device's surface than the elevation step 161 (intermediate height), and the elevation step 163 is farthest from the device's surface (tallest). In the x-axis and/or y-axis direction(s), the elevation step 161 is widest, the elevation step 162 is intermediately wide, and the elevation step 163 is narrowest.

The backplate body 105 may include steps that complement the elevation steps 161-163. In other words, the opening 145 of the backplate body 105 may include a first de-elevation step that fits with elevation step 161, a second de-elevation step that fits with elevation step 162, and a third de-elevation step that fits with elevation step 163. Accordingly, the backplate body 105 may fit or hug various steps of the camera bump 160.

In one or more embodiments, while the elevation step 161 is widest in the x-axis and/or y-axis direction(s), the elevation steps 162 and/or 163 (e.g., camera frame and camera lens, respectively) are the same or less height than the elevation step 161 (e.g., camera bump base). For example, the elevation step 161 may include a raised border but a surface lower than the raised border inside the boundary of the border. In a non-limiting analogy, the elevation step 161 may be to the elevation steps 162 and/or 163 like a traditional wristwatch's bezel is to the wristwatch's face: as tall or taller, and at least partially surrounding. Or in another non-limiting analogy, the camera frame and/or camera lens are located inside a "crater" created by the camera base's border. Even so, in some embodiments, the backplate body 105 de-elevation step(s) may fit the elevation step 161, not fit the elevation step 162 because it is recessed with respect to the elevation step 161, but fit the elevation step 163 if it is as tall or taller than the elevation step 161. Meanwhile, in some embodiments, the backplate body 105 de-elevation step(s) may fit the elevation step 161, also fit the elevation step 162 even if it is recessed with respect to the elevation step 161 (e.g., the shape of the backplate body 105 includes a portion less de-elevated [extending into the crater] than elevation step 161 which fits the camera frame), and/or fits the elevation step 163 whether it is shorter, as tall, or taller than the elevation step 161.

In one or more embodiments, the elevation step(s) 161, 162, and/or 163 may be other components of the device 150. For example, the elevation step(s) 161, 162, and/or 163 may be a flash light frame/assembly (e.g., a structure concentrically surrounding and/or supporting a flash light) and/or a flash light lens. Accordingly, the de-elevation step(s) may fit flash light frame(s)/assembly(ies) and/or flash lights.

In one or more embodiments, the elevation step(s) 161, 162, and/or 163 include beveled, chamfered, partially bull-nosed, eased, or otherwise non-90° edges (e.g., at the borders or boundaries). In some embodiments, the de-elevation steps are shaped in a complementary manner to fit the shape/contour of the edges.

It should be noted that the backplate body 105 de-elevation steps may be formed via injection/die cast molding, machining, or any other manufacturing process. It should be noted that one or more de-elevation steps may be formed to abut the camera lens assembly(ies) or camera lenses, but not cover other areas that should stay uncovered (e.g., camera flash, sensors, etc.).

In various embodiments described herein, device 150 may include a computer system such as discussed below with respect to FIGS. 10 and 11.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

Embodiments may be implemented on a specialized computer system. The specialized computing system can include one or more modified mobile devices (e.g., laptop computer, smart phone, personal digital assistant, tablet computer, or other mobile device), desktop computers, servers, blades in a server chassis, or any other type of computing device(s) that include at least the minimum processing power, memory, and input and output device(s) to perform one or more embodiments.

Figure 10:
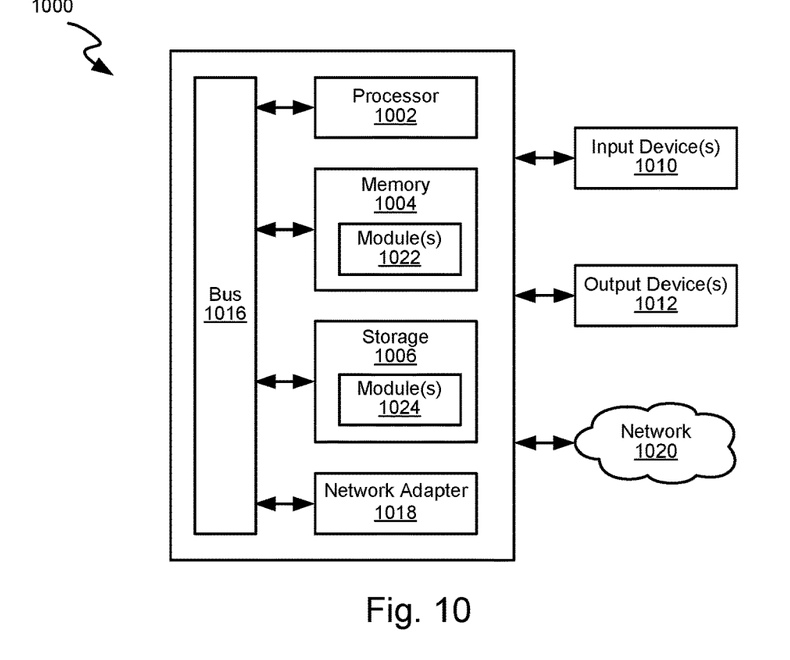
FIGS. 10 and 11 show a computing system and network architecture in accordance with one or more embodiments.

For example, as shown in FIG. 10, the computing system 1000 may include one or more computer processor(s) 1002, associated memory 1004 (e.g., random access memory (RAM), cache memory, flash memory, etc.), one or more storage device(s) 1006 (e.g., a hard disk, an optical drive such as a compact disk (CD) drive or digital versatile disk (DVD) drive, a flash memory stick, etc.), a bus 1016, and numerous other elements and functionalities. The computer processor(s) 1002 may be an integrated circuit for processing instructions. For example, the computer processor(s) may be one or more cores or micro-cores of a processor.

In one or more embodiments, the computer processor(s) 1002 may be an integrated circuit for processing instructions. For example, the computer processor(s) 1002 may be one or more cores or micro-cores of a processor. The computer processor(s) 1002 can implement/execute software modules stored by computing system 1000, such as module(s) 1022 stored in memory 1004 or module(s) 1024 stored in storage 1006. For example, one or more of the modules described herein can be stored in memory 1004 or storage 1006, where they can be accessed and processed by the computer processor 1002. In one or more embodiments, the computer processor(s) 1002 can be a special-purpose processor where software instructions are incorporated into the actual processor design.

The computing system 1000 may also include one or more input device(s) 1010, such as a touchscreen, keyboard, mouse, microphone, touchpad, electronic pen, or any other type of input device. Further, the computing system 1000 may include one or more output device(s) 1012, such as a screen (e.g., a liquid crystal display (LCD), a plasma display, touchscreen, or other display device), a printer, external storage, or any other output device. The computing system 1000 may be connected to a network 1020 (e.g., a local area network (LAN), a wide area network (WAN) such as the Internet, mobile network, or any other type of network) via a network interface connection 1018. The input and output device(s) may be locally or remotely connected (e.g., via the network 1020) to the computer processor(s) 1002, memory 1004, and storage device(s) 1006.

One or more elements of the aforementioned computing system 1000 may be located at a remote location and connected to the other elements over a network 1020. Further, embodiments may be implemented on a distributed system having a plurality of nodes, where each portion may be located on a subset of nodes within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

For example, one or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface.

One or more elements of the above-described systems may also be implemented using software modules that perform certain tasks. These software modules may include script, batch, routines, programs, objects, components, data structures, or other executable files that may be stored on a computer-readable storage medium or in a computing system. These software modules may configure a computing system to perform one or more of the example embodiments disclosed herein. The functionality of the software modules may be combined or distributed as desired in various embodiments. The computer readable program code can be stored, temporarily or permanently, on one or more non-transitory computer readable storage media. The non-transitory computer readable storage media are executable by one or more computer processors to perform the functionality of one or more components of the above-described systems and/or flowcharts. Examples of non-transitory computer-readable media can include, but are not limited to, compact discs (CDs), flash memory, solid state drives, random access memory (RAM), read only memory (ROM), electrically erasable programmable ROM (EEPROM), digital versatile disks (DVDs) or other optical storage, and any other computer-readable media excluding transitory, propagating signals.

Figure 11:
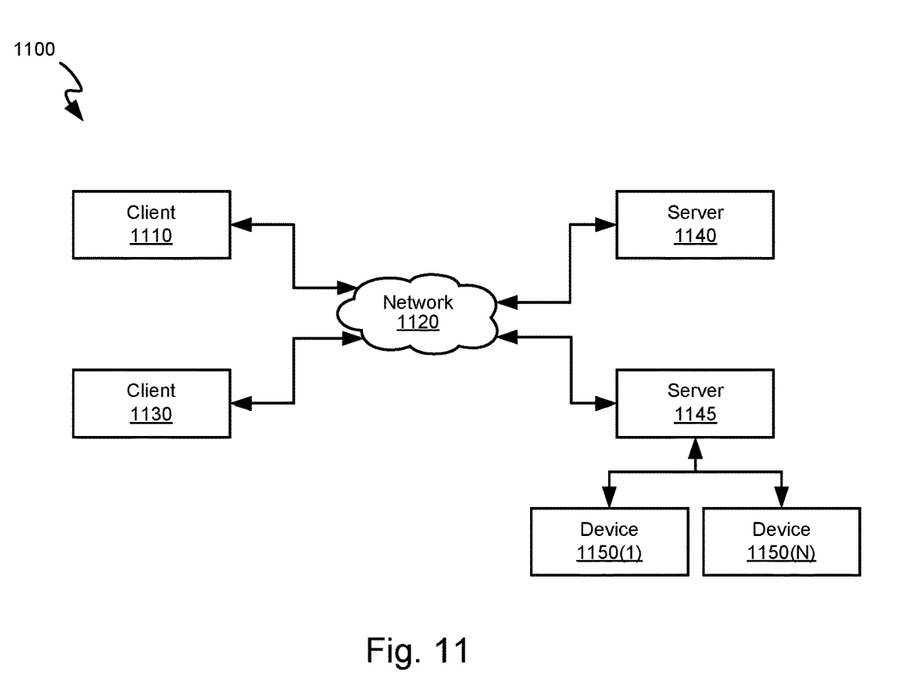

FIG. 11 is a block diagram of an example of a network architecture 1100 in which client systems 1110 and 1130, and servers 1140 and 1145, may be coupled to a network 1120. Network 1120 may be the same as or similar to network 1020. Client systems 1110 and 1130 generally represent any type or form of computing device or system, such as client devices (e.g., portable computers, smart phones, tablets, smart TVs, etc.).

Similarly, servers 1140 and 1145 generally represent computing devices or systems, such as application servers or database servers, configured to provide various database services and/or run certain software applications. Network 1120 generally represents any telecommunication or computer network including, for example, an intranet, a wide area network (WAN), a local area network (LAN), a personal area network (PAN), or the Internet.

With reference to computing system 1000 of FIG. 10, a communication interface, such as network adapter 1018, may be used to provide connectivity between each client system 1110 and 1130, and network 1120. Client systems 1110 and 1130 may be able to access information on server 1140 or 1145 using, for example, a Web browser, thin client application, or other client software. Such software may allow client systems 1110 and 1130 to access data hosted by server 1140, server 1145, or storage devices 1150(1)-(N). Although FIG. 11 depicts the use of a network (such as the Internet) for exchanging data, the embodiments described herein are not limited to the Internet or any particular network-based environment.

In one embodiment, all or a portion of one or more of the example embodiments disclosed herein are encoded as a computer program and loaded onto and executed by server 1140, server 1145, storage devices 1150(1)-(N), or any combination thereof. All or a portion of one or more of the example embodiments disclosed herein may also be encoded as a computer program, stored in server 1140, run by server 1145, and distributed to client systems 1110 and 1130 over network 1120.

What is claimed is:

1. A cell phone device protector comprising:
   a backplate body, wherein the backplate body includes:
      an inner side that is flat and does not include perpendicularly rising edges,
      an outer side that is flat and does not include perpendicularly rising edges,
      a cutout portion configured to surround and closely fit an outer boundary of a camera bump to secure the device protector with respect to a device that includes the camera bump, and
      a thickness equal to or greater than a height of the camera bump;
   at least one magnet, wherein the magnet is:
      located within the backplate body,
      operable to attract the device via magnetic force to establish and maintain direct physical contact between the backplate body and the device, and
      configured to allow charging of the device by a wireless charging device while the backplate body and the device are in direct physical contact; and
   no other layers nor components on the inner side nor outer side of the backplate body.

2. The cell phone device protector of claim 1, wherein the backplate body is one integral mass.

3. The cell phone device protector of claim 1, wherein the backplate body is an injection mold around the at least one magnet.

4. The cell phone device protector of claim 1, wherein the thickness of the backplate body is equal to or greater than a height of one or more camera lenses located in the camera bump.

5. The cell phone device protector of claim 1, wherein the at least one magnet is a single integral mass.

6. The cell phone device protector of claim 1, wherein the at least one magnet is two or more magnets.

7. The cell phone device protector of claim 1, wherein the at least one magnet is substantially circular in shape.

8. The cell phone device protector of claim 1, wherein the at least one magnet is a first set of magnets in a first location and a second set of magnets in a second location, wherein the first location is different from the second location.

9. The cell phone device protector of claim 1, wherein the at least one magnet includes attractive forces in both z-axis directions, wherein the x-axis and y-axis are planar with the backplate body, and wherein the z-axis is orthogonal to the x-axis and y-axis.

10. The cell phone device protector of claim 1, wherein the at least one magnet comprises at least one rare-earth magnet.

11. The cell phone device protector of claim 1, wherein the material of the backplate body comprises at least one selected from a group consisting of plastic, metal, wood, paper, and leather.

12. The cell phone device protector of claim 1, wherein the backplate body comprises a non-magnetic metal.

13. A cell phone device protector comprising:
a backplate body, wherein the backplate body includes:
   an inner side that is flat and does not include perpendicularly rising edges,
   an outer side that is flat and does not include perpendicularly rising edges,
   an opening configured to surround and substantially abut an outer boundary of a camera bump to secure the device protector with respect to a device that includes the camera bump, and
   a thickness equal to or greater than a height of the camera bump;
at least one magnet, wherein the magnet is:
   located at least partially in the backplate body,
   operable to attract the device via magnetic force to establish and maintain direct physical contact between the backplate body and the device, and
   configured to allow charging of the device by a wireless charging device while the backplate body and the device are in direct physical contact; and
no other layers nor components on the inner side nor outer side of the backplate body.

14. The cell phone device protector of claim 13, wherein the backplate body is one integral mass.

15. The cell phone device protector of claim 13, wherein the backplate body is an injection mold around the at least one magnet.

16. The cell phone device protector of claim 13, wherein the thickness of the backplate body is equal to or greater than a height of one or more camera lenses located in the camera bump.

17. The cell phone device protector of claim 13, wherein the at least one magnet is a single integral mass.

18. The cell phone device protector of claim 13, wherein the at least one magnet is two or more magnets.

19. The cell phone device protector of claim 13, wherein the at least one magnet is substantially circular in shape.

20. The cell phone device protector of claim 13, wherein the at least one magnet is a first set of magnets in a first location and a second set of magnets in a second location, wherein the first location is different from the second location.

* * * * *